United States Patent Office 3,787,382
Patented Jan. 22, 1974

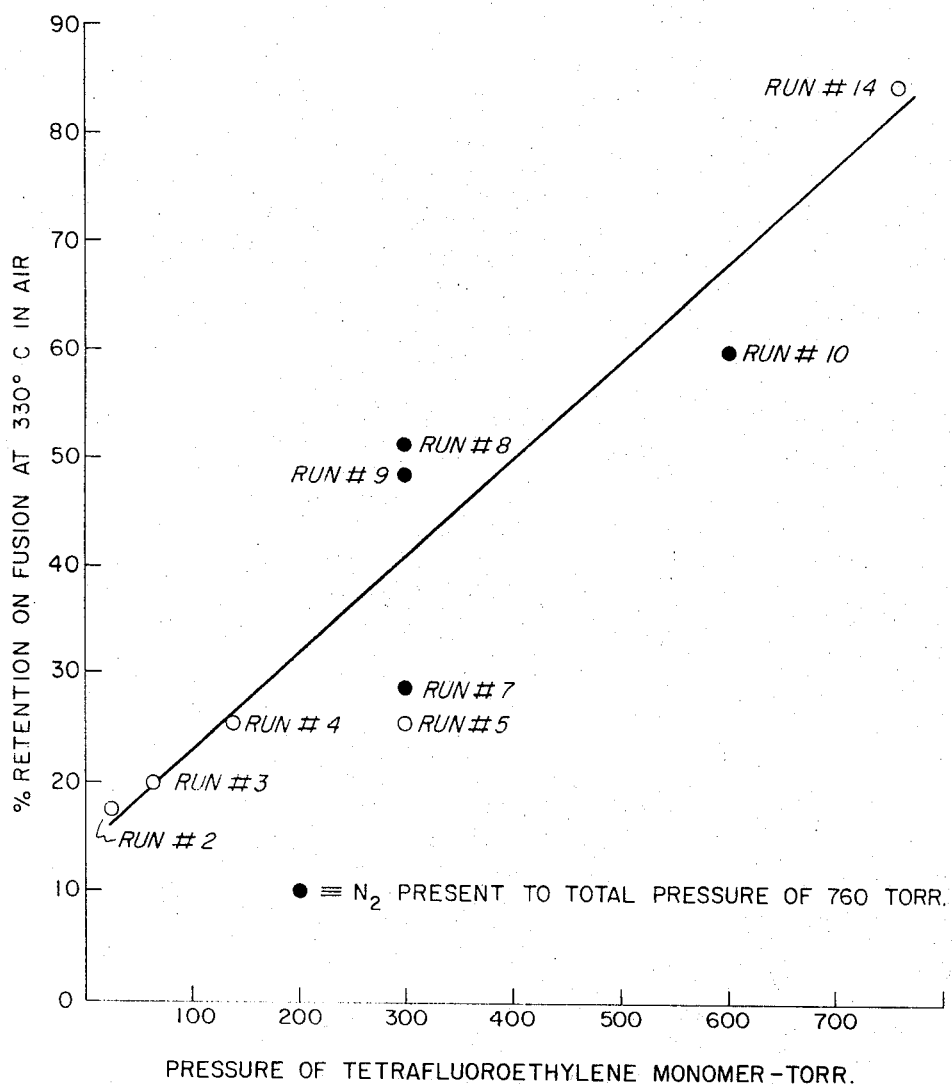

---

3,787,382
PHOTOPOLYMERIZATION OF TETRAFLUORO-
ETHYLENE AND POLYMER AND PRODUCTS
PRODUCED THEREFROM
Archibald N. Wright, Schenectady, N.Y., William R.
Burgess, Woburn, Mass., and Edward V. Wilkus, Monroe, Conn., assignors to General Electric Company
Continuation of abandoned application Ser. No. 3,724,
Jan. 19, 1970. This application Feb. 16, 1972, Ser. No.
226,947
Int. Cl. C08d 1/00; C08f 3/24
U.S. Cl. 260—92.1 R                2 Claims

ABSTRACT OF THE DISCLOSURE

A process for producing novel white powdery tetrafluoroethylene polymer by irradiating tetrafluoroethylene monomer vapor at a temperature ranging from about 0° to about 200° C. and at a pressure of about 10 torr to 760 torr with ultraviolet light having a wave length in the range of about 1800 to 2400 angstroms. This polymer can be fused, generally at temperatures of about 350° C. and lower, to form coatings, particularly water-clear coatings, self-supporting films and other shaped products.

---

This is a continuation of application Ser. No. 3,724, filed Jan. 19, 1970, now abandoned.

This invention relates to an ultraviolet radiation process for producing novel tetrafluoroethylene polymer. In one particular aspect, it relates to coatings and self-supporting films, particularly water-clear coatings and films, and other products shaped from the present polymer. In still another aspect, this invention relates to laminates bonded by the present polymer.

In the past, terafluoroethylene vapor has been phoopolymerized by a few very specific methods. One method, disclosed by J. Chem. Soc. (London), pp. 2684-94 (1952), relates to a mercury photosensitized reaction of tetrafluoroethylene using light having a wave length of 2537 angstroms. The article discloses that the main products of reaction are hexafluorocyclopropane and polytetrafluoroethylene, and that over the pressure range of 1-35 cm., the quantum efficiency of formation of hexafluorocyclopropane increases with increasing pressure. In contrast, the present process produces a tetrafluoroethylene polymer which has its own unique properties and which is convertible, by fusion, to a novel fused form of polytetrafluoroethylene. Also, the present process does not use a sensitizer, and a wave length of 2537 angstroms would not be operable.

A second method is disclosed by U.S. Pat. No. 3,228,-865 wherein vapors of tetrafluoroethylene in admixture with nitrous oxide as a sensitizer are subjected to actinic light and especially light rich in wave lengths of from about 2500 to 2700 angstroms. In the single example of the patent, light principally of wave lengths of 2537 angstroms is used. This patent specifically discloses that the polytetrafluoroethylene obtained was a white solid material having physical properties identical with polytetrafluoroethylene produced by usual methods, e.g. by polymerization in aqueous suspension. In contrast, the present process does not initially produce polytetrafluoroethylene. What is first produced is a novel tetrafluoroethylene polymer which, upon fusion, is converted to a novel fused form of polytetrafluoroethylene. This tetrafluoroethylene polymer is not produced at a wave length higher than 2400 angstroms in the present process.

In copending application Ser. No. 618,132 filed Feb. 23, 1967, now U.S. Pat. 3,522,076, and assigned to the same assignee as the present invention, there is disclosed the formation of thin continuous films on a substrate by the photopolymerization of tetrafluoroethylene gas having a vapor pressure not exceeding 3 mm. Hg (torr) using ultraviolet light with an effective wave length of 1800 to 2400 angstroms. In contrast, the present process initially does not form a thin continuous film on a substrate. It forms, instead, a white flocculent snow-type polymer which can be fused into a clear continuous coating. Also, unlike the process of the copending application which is a surface-type polymerization, the present reaction is a gas-phase reaction, and as a result, the white tetrafluoroethylene polymer formed deposits at random throughout the reactor. In addition, to form the present polymer, a monomer pressure significantly higher than the 3 mm. Hg pressure of the copending application is required.

Since bulk polymerization of tetrafluoroethylene is highly exothermic and hazardous, commercially available polytetrafluoroethylene is generally prepared in aqueous suspensions under super-atmospheric pressures and at temperatures higher than room temperatures. Presently available commercial polytetrafluoroethylene does not melt but evaporates and decomposes at temperatures of about 400° C. Since this polymer cannot be molded by conventional techniques used for molding thermoplastic polymers, it is usually fabricated by sintering a cold pressed form of the polymer particles at temperatures of about 375-390° C. The polymer particles are cohered by such sintering, but they do not undergo any significant coalescence due to their lack of thermoplasticity. The resulting product is, therefore, substantially opaque and gas permeable.

It is an object of the present invention to produce novel tetrafluoroethylene polymer at substantially atmospheric pressure or below, and preferably at room temperatures.

In contrast to common forms of polytetrafluoroethylene, the present polymer is fusible. Fusion of the polymer herein means coalescence or a flowing together of the particles into a substantially integral form. On the other hand, sintering herein indicates a coherence of the particles essentially at their boundaries with little or no coalescence. Since the present polymer is fusible, films and coatings produced therefrom are less gas permeable and more stain-resistant than products fabricated by sintering conventional polytetrafluoroethylene. The present fused coatings also give greatly improved corrosion and water-scale resistance to metal substrates. The fused tetrafluoroethylene polymer film may be used as dielectric with insulating properties from thicknesses of 1000 A. to 1 mil and above.

Briefly stated, the process of the present invention for forming tetrafluoroethylene polymer comprises providing tetrafluoroethylene vapor at a pressure of about 10 torr to 760 torr at a temperature of about 0° C. to 200° C., and subjecting said vapor to ultraviolet light having a wave length of about 1800 to 2400 angstroms.

The process of the present invention is carried out satisfactorily with the temperature of the tetrafluoroethylene vapor at room temperature, i.e. 25° C., or at a temperature close to room temperature, and these temperatures are preferred. However, the process is operable with the monomer temperature ranging from 0° C. to 200° C., but there is no advantage in intentionally using a temperature significantly higher or lower than room temperature.

The pressure of the tetrafluoroethylene monomer may vary widely depending largely upon the particular rate of polymerization desired as well as upon the particular type of floc polymer desired to be formed. The process is operable with the tetrafluoroethylene monomer vapor pressure varying from about 10 torr to about 760 torr. The lower the monomer vapor pressure, the slower is the rate at which the polyme forms. For example, if the process is used to deposit a layer of the polymer on a substrate surface, the lower the tetrafluoroethylene vapor pressure, the slower is the rate of deposition. Likewise, the rate of polymerization or polymer deposition increases with increasing pressure. Pressures higher than atmospheric pressure are not useful due to the danger of explosion. In addition, pressures higher than atmospheric would tend to produce high molecular weight polymers which are less thermoplastic, and at pressures significantly higher than atmospheric, the polymer formed would no longer be fusible.

In the present process, it has been found that with increasing tetrafluoroethylene monomer vapor pressure, a tetrafluoroethylene floc polymer of higher thermal stability is formed. Specifically, the polymer formed at higher tetrafluoroethylene monomer vapor pressures requires higher fusion temperatures than the polymer formed at lower monomer vapor pressures. In addition, during fusion, the polymer formed at lower pressures undergoes more weight loss, i.e. has a lower percent retention, than the polymer formed at higher pressures indicating that larger amounts of lower molecular weight polymer are formed at the lower tetrafluoroethylene vapor pressures. The percent by weight retention characteristic of the floc polymer formed at varying pressures in the present process is illustrated in the accompanying figure where percent by weight retention on fusion at 330° C. in air is plotted against the pressure of tetrafluoroethylene monomer at which the tetrafluoroethylene polymer was formed. All the runs were carried out as indicated in the accompanying tables according to the instant process, i.e. the numbered runs of the figure correspond to the tabulated runs of the same number. Specifically, the percent by weight retention on fusion was obtained by weighing the polymer coated substrate before and after fusion and the difference in weight was divided by the weight before fusion. As illustrated by the accompanying figure, the percent retention on fusion increases with increasing pressure of the tetrafluoroethylene monomer when the monomer is used alone as well as when the monomer is mixed with nitrogen gas.

In the present process, the tetrafluoroethylene monomer vapor is exposed to ultraviolet light having a wave length of 1800 to 2400 angstroms to form the polymer. Since no sensitizers are used, wave lengths outside the 1800 to 2400 angstrom range are not effective in the present process. Light having a wave length of 1840 to 2200 angstroms produces a particularly satisfactory rate of polymerization, especially at room temperatures and atmospheric pressure. The rate of polymerization is also proportional to the intensity of the light as well as the pressure of the tetrafluoroethylene monomer, i.e. the more intense the light, the faster is the rate of polymerization. These factors can be readily controlled so as to obtain a satisfactory rate of polymerization.

Ultraviolet light from any source and of any type can be used. The light source need only furnish an effective amount of light of the required wave length, i.e. 1800 to 2400 angstroms. Suitable light sources include carbon arcs, high pressure mercury vapor lamps, fluorescent lamps, argon glow lamps, photographic flood lamps and tungsten lamps.

The present process can be carried out in a number of different types of enclosures or reactors. The reactor, for example, can be a metal can. It need not be gas tight since polymer formation is not affected by the presence of other gases such as air, oxygen, moisture and nitrogen.

In one embodiment of the present process, gases or vapors, referred to herein as diluent gases, may be present in widely varying amounts, but generally not in an amount which would raise the total pressure of the reactor significantly higher than one atmosphere, without having any deteriorating effect on the process or the polymer formed. The diluent gases are generally used to maintain the reaction atmosphere at atmospheric pressure. The maintenance of atmospheric pressure is of particular use for reactors for manufacturing purposes, which may collapse if the reaction is carried out at subatmospheric pressure. It is understood that up to about one atmosphere total pressure within the reactor, it is the pressure of the tetrafluoroethylene monomer gas that determines the molecular weight of the tetrafluoroethylene polymer formed. Specifically, it is the tetrafluoroethylene gas monomer pressure which substantially controls the rate of deposition of the floc polymer, its molecular weight average, its molecular weight distribution, and its molecular structure. Thus, this process gives "tailored" fluorocarbon polymer.

Specifically, to some extent the thermoplasticity of the polymer is controlled by controlling the extent of its pendant $CF_3$ groups. The degree to which these $CF_3$ groups are present is indicated by the intensity of the absorption line at 980 cm$^{-1}$., the greater the intensity of this absorption line, the larger is the number of $CF_3$ groups present. We have found that the longer the residence time of the monomer charge, and hence build-up of byproduct vapors, the greater is the amount of the $CF_3$ pendant groups in the resulting tetrafluoroethylene polymer. These $CF_3$ pendant groups usually disappear when fusion of the polymer is complete so that the result is a fused tetrafluoroethylene polymer having the same infrared spectra as conventional tetrafluoroethylene. However, in some cases, if desired, additional heating of the fused polymer film at a temperature higher than 350° C. may be necessary to completely remove all of the $CF_3$ groups.

The tetrafluoroethylene polymer formed is a white, flocculent, powdery "snow-like" type of material. This polymer is slippery to the touch and exhibits the same nonadhesive characteristics as conventional polytetrafluoroethylene.

However, infrared analysis of this polymer shows significant absorption at the 980 cm.$^{-1}$ line, which indicates the presence of $CF_3$ pendant groups. On the other hand, infrared analysis of conventional polytetrafluoroethylene shows no absorption at the 980 cm.$^{-1}$ line. Differential scanning calorimetry data of the snow-like polymer shows evidence of first-order, crystal-crystal transition at about 20° C. to 30° C. as found in polytetrafluoroethylene. In addition, the tetrafluoroethylene polymer of the present invention has an index of refraction of about 1.5. In view of such test data, in combination with its snow-like floc powdery form, it is believed that the present tetrafluoroethylene polymer is a new composition of matter. In addition, the present polymer fuses in air at temperatures from about 100° C. to about 350° C. depending largely on the particular tetrafluoroethylene monomer pressure used in forming the polymer. Infrared analyses of the fused polymer and of conventional polytetrafluoroethylene yield the same structural analysis.

The white snow-like particulate polymer of the present invention can be used for a number of applications. It is useful, for example, as a lubricant. It can be mixed with pigments, preferably inorganic pigments, to form a wide variety of colored materials. It can also be admixed with a number of particulate fillers to form lubricating greases of various types. It can also be formed into aqueous emulsions or suspensions in a conventional manner using conventional surfactants and dispersants. If desired, the present tetrafluoroethylene polymer can be admixed with another polymer which may be thermoplastic or thermosetting, and the mixture then fused to produce a wide variety of novel compositions of matter. In another embodiment of the present inveniton, the tetrafluoroethylene polymer can also be admixed with conventional fillers, and the mixtures fused to produce novel compositions of matter.

The polymer of the present invention is particularly useful in forming coatings. The tetrafluoroethylene polymer can be initially deposited on the substrate by a number of methods. For example, if convenient, the substrate may be placed in the reaction chamber and, as the tetrafluoroethylene polymer forms, it deposits at random throughout the reactor and thereby directly on the substrate.

Generally, better results are obtained by maintaining the substrate within the reactor at about room temperatures to produce a more uniform deposit of floc polymer when higher monomer pressures are used. Usually, such cooling of the substrate is desirable at tetrafluoroethylene monomer gas pressures in excess of 300 torr.

Specifically, the present process has excellent "throwing power," i.e. penetrating into corners, nooks, crannies, and interstitial spaces of the substrates. The floc polymer has appreciable tenacity for substrates and is not dislodged by normal handling.

A concave shaped highly polished substrate should be used within the reactor with caution since it reflects the ultraviolet light and may raise the temperature in the area of the reactor window, where the lamp is outside the window, so high as to decompose the polymer being formed in that area.

Alternatively, the tetrafluoroethylene polymer can be manually or mechanically deposited on the substrate surface outside the reactor. The polymer may also be deposited by coating the substrate with an emulsion or suspension of the polymer. The deposited polymer is then fused, at a temperature generally ranging from about 100 to about 350° C.

The coating can be formed on a wide variety of substrates of various forms solid and porous, and of varying compositions including metals and non-metals. Typical substrate forms include sheets, tubes, whiskers, particles, filaments, and fibers, particularly glass fibers. Examples of metallic substrates include lead, niobium, copper, gold, silver, steel, tin, iron, brass and aluminum. Examples of nonmetallic substrates are glass, quartz, mica, carbon, boron, cotton, and textiles and mixtures thereof. Liquid substrates such as water droplets can also be used.

The thickness of the fused polymer coating may vary widely depending largely on the depth to which the polymer was initially deposited. Fused coatings are usually water-clear and any opacity present in the coating generally indicates incomplete fusion.

Substrates coated with the fused polymer according to the present invention have a number of applications. One of the most important applications is in the manufacture of cooking utensils which normally are fabricated with a Teflon coating. Glass fibers coated by the present fused polymer are particularly useful as reenforcing fillers for polymers.

The tetrafluoroethylene polymer of the present invention can also be shaped by conventional techniques used in shaping thermoplastic polymers to form self-supporting films and a wide variety of shaped products.

Novel laminates can also be formed using the tetrafluoroethylene polymer of the present invention as disclosed and claimed in copending U.S. patent application Ser. No. 4,121, now U.S. Pat. No. 3,673,054 filed of even date herewith in the name of Victor J. Mimeault, Archibald N. Wright and Edward V. Wilkus, and assigned to the assignee hereof and which, by reference, is made part of the disclosure of the present application. The laminates are bonded by the fused polymer and can be formed by a number of methods. The lamina used may be porous or solid and may be metallic or nonmetallic. For example, in forming a laminate using solid laminate the tetrafluoroethylene polymer can be deposited in the polymerization zone directly on the surface to be bonded, or outside the zone, manually or mechanically. A second solid lamina is then placed over the deposited polymer to form a composite which is then heat-compressed to fuse the polymer and form the laminate. The present tetrafluoroethylene polymer can also be deposited from an aqueous emulsion or suspension, but in such instance, it should be dried to remove the water before forming the composite.

All parts and percentages used herein are by weight unless otherwise indicated. The invention is further illustrated by the following examples. In all of the following runs of the examples the procedure was as follows unless otherwise noted:

Ultraviolet light was provided by a 700 watt Hanovia lamp, Model No. 674A which emitted ultraviolet light of wave length ranging from about 1849 A. to about 13,673 A. Specifically, it emitted ~17 watts of light of wave length of about 1849 to 2400 A. and ~131 watts of wave length of 2400 A. to 3360 A. in the ultraviolet. The lamp was provided with a reflector. This lamp was capable of heating the reactor system to about 200° C.

The tetrafluoroethylene monomer gas used in all of the runs was free of inhibitor. Specifically, if the monomer source were at room temperature in the shipping cylinder, the gas was passed through a Dry Ice trap to remove inhibitor. Otherwise, a liquid source of tetrafluoroethylene, pre-purified from inhibitor by distillation, was used as the direct source of the monomer vapor at low temperatures.

In all of the runs the temperature of the tetrafluoroethylene monomer vapor was below room temperature when introduced into the reactor, but shortly after introduction into the reactor, usually less than within about 1 minute, the vapor equilibrated to room temperature, and during the run its temperature raised by the ultraviolet light to above room temperature. Dry $N_2$ gas, when used, was at room temperature when introduced into the reactor.

Substrates were placed in the reactor before each run was begun. The aluminum coupons used as substrates were 1 inch wide, 3 inches long and 3/32 inches thick and were pre-cleaned with a trichloroethylene dip. The substrate temperatures tabulated for each run were those of the aluminum coupon substrates only. Other metallic substrates used were of a size similar to that of the aluminum coupons.

Rate of polymerization (A./min.) was determined by weight measurement on coated and uncoated substrates and by capacitance measurements on the fused "floc" material.

When heating the specimen, i.e. the floc polymer coated substrate, in the furnace, the specimen was contained horizontally in a glass enclosure to minimize air turbulence which was vented to allow access to air.

Coating thicknesses were obtained by the mercury-drop/capacitance method, and corroborated by the weight of coating.

Weighing was done on a Sartorius automatic balance, accurate to a milligram.

Water repellency was estimated from the behavior of a water drop on the coated surface.

General stain resistance was estimated by the ease with which a stain on a coated surface could be wiped away with a dry paper towel. The stain was made with a blue, felt-tip marking pencil; by stroking 10 cycles in the same spot, then allowing the stain mark to dry for 20 seconds. Resistance to food stains were estimated by long-term immersion in food media, e.g. 50 brewings of coffee, followed by ease of removal by one wipe with a damp sponge.

EXAMPLE 1

In Runs 1 through 10, the reactor was essentially a rectangular vacuum reaction chamber, approximately 13 cm. wide, 29 cm. long and 7 cm. high. In the chamber top was an 8 x 20 cm. quartz window which was situated directly above, and 3 cm. from, an 8 x 20 cm. copper cooling block inside the chamber on which the substrates were placed. The block was cooled by the internal flow of fluid, cooled and driven outside the chamber. Ultraviolet input was provided by the Hanovia lamp which was aligned over, and 5 cm. away from, the window. The quartz window used was transparent to light of wave

| Run number | Tetrafluoroethylene (TFE) pressure (torr) | Other gas present and pressure | Total pressure (torr) | Substrate within reactor | Substrate temp. (°C.) | Period of time light applied (minutes) | Rate of polymerization (A./min.) | Tetrafluoroethylene polymer formed (description) | Fusion in air Temp. (°C.) | Fusion in air Percent retention | Description of fused polymer |
|---|---|---|---|---|---|---|---|---|---|---|---|
| 1 | 8 | None | 8 | Al coupons | 70 | 135 | 260 | White "floc". It showed absorption at 980 cm.$^{-1}$. | ~250 | 6 | After heating at 325° C. for 30 min. the clear film showed thickness ~2,200 A. It had fair stain resistance and showed no absorption at 980 cm.$^{-1}$. |
| 2 | 25 | do | 25 | Al coupons, Al foil, bright anodized Al. | 15-64 | 135 (every 10 min. system evacuated to about 1 torr, refilled with TFE to 25 torr). | 760 | White "floc" absorption at 980 cm.$^{-1}$. | ~330 | 18 | Clear film produced after fusing at 330° C. for 30 min. Fused film showed excellent stain resistance no absorption at 980 cm.$^{-1}$. |
| 3 | 60 | do | 60 | Al coupons | (¹) | 60 (every 10 min. system evacuated to about one torr, refilled with TFE to 60 torr). | 825 | White "floc". It showed absorption at 980 cm.$^{-1}$. "Floc" can be scraped off substrates but shows appreciable tenacity for the substrates. Shaded areas and vertical edges show extensive and substantially uniform "floc" deposition. | ~330 | ~20 | Clear fused film produced heating at 330° C. for 30 min. It showed no absorption at 980 cm.$^{-1}$. Molecular weight distribution (weight loss) narrower than at 25 or 8 torr of runs 1 and 2, as determined by thermogravimetric analysis. |
| 4 | 125 | do | 125 | do | -5-15 | 60 (every 10 min. system evacuated to about one torr, refilled with TFE to 125 torr). | 950 | White "floc". It showed bsorption at 980 cm.$^{-1}$. X-ray analysis indicated some crystalline character. "Floc" could be dispersed in water with use of liquid detergent. | ~330 | 25 | Clear film produced after fusion at 330° C. for 30 min. It showed no absorption at 980 cm.$^{-1}$. |
| 5 | 300 | do | 300 | Al coupons. Brown colored aluminum samples. | 47-153 | 55 (every 10 min. reactor evacuated to about one torr, refilled with TFE to 300 torr). | 1,300 | White "floc" also successfully deposited on colored substrates. | ~330 | 25 | Do. |
| 6 | 300 | do | 300 | Aluminum coupons | 30 | 30 minutes (every 10 min. reactor evacuated to about one torr and refilled with TFE gas in reactor remained constant. | 0 | Nothing formed. Pressure of TFE to pressure of 300 torr). | | | |
| 7 | 300 | Reactor pre-evacuated, then 300 torr TFE monomer gas added, then 440 torr of dry N₂ gas added. | 740 | Al coupons, Silver and copper substrates. | -5-35 | 35 (every 10 min. reactor evacuated to about one torr, refilled with TFE to 300 torr then 440 torr of N₂ added). | 1,590 | Presence of N₂ had no apparent effect on properties of "floc." | ~330 | 29 | Do. |
| 8 | 300 | Reactor flushed with dry N², then pre-evacuated to 440 torr of N², then 300 torr of TFE monomer gas added. | 740 | At coupons, unglazed crockery chips. | 5-19 | 35 (every 10 min. gas reaction mixture replaced without using strong vacuum). | 1,360 | Absence of pre-evacuation step had no significant effect on the properties of the "floc." | ~330 | 52 | Do. |
| 9 | 300 | Reactor pre-evacuated, then monomer gas added, then 440 torr of dry N² gas added. | 740 | At coupons | 5-19 | 35. No replacement of reaction mixture. | 1,850 | Absence of recycling monomer-inert gas stock had no effect on the amount of "floc" formed. | ~330 | 49 | Clear film produced after fusion at 330° C. for 30 min. It showed very slight evidence at 980 cm.$^{-1}$. |
| 10 | 600 | Same as Run No. 9, except that 140 torr of dry N² gas used. | 740 | At coupons, Lead and tin substrates. | 10-33 | do | 1,960 | do | ~330 | 61 | Clear film produced after fusion at 330° C. for 30 min. It showed considerable vidence at 980 cm.$^{-1}$. |

¹ Not measured.

length greater than about 1800 A. Tetrafluoroethylene monomer pressure inside the chamber was obtained and maintained through a valved connection to a temperature-regulated source of tetrafluoroethylene monomer which was maintained at the source below room temperature. Thermocouples inside the chamber enabled the recording of the temperature of the block as well as specimens thereon.

Specifically, in Run No. 1 the reactor was evacuated and the tetrafluoroethylene monomer was then flowed in until it registered a pressure of 8 torr. The ultraviolet light was then applied for a period of 135 minutes. After about 2 minutes of the ultraviolet light application, white tetrafluoroethylene polymer floc became visible and continued to form throughout the period of time the ultraviolet light was applied. The white floc polymer deposited at random throughout the reactor and on the substrates therein. When the ultraviolet light was shut off at the end of the run, floc deposition ceased. The floc was examined and was found to be snowy white and powdery. It was slippery and non-adhesive. Infrared analysis of a sample of the floc showed absorption at 980 cm.$^{-1}$.

One of the floc coated substrates of Run No. 1 was completely fused by heating it to a temperature of about 250° C. The fused coating was water clear, continuous and showed good adherence to the substrate. After fusion a 6 percent by weight retention was found which indicates that the floc polymer contained a large amount of lower molecular weight polymer which was lost during fusion. The fused polymer coating was then heated again but at a temperature of 325° C. for 30 minutes leaving a water clear film which had a thickness of approximately 2200 A. This clear film displayed no infrared absorption at 980 cm.$^{-1}$, indicating that the heating of the initial tetrafluoroethylene polymer can convert it to a fused tetrafluoroethylene polymer which displays the same infrared characteristics as conventional polytetrafluoroethylene.

In Run No. 2, the reactor was evacuated and the tetrafluoroethylene monomer was flowed in until it registered a pressure of 25 torr. The ultraviolet light was then applied continuously for a period of 135 minutes during which time the reactor was evacuated every 10 minutes and the monomer gas again flowed in until it registered a pressure of 25 torr. The white floc polymer became visible after about 2 minutes of ultraviolet light application and deposited at random throughout the reactor. No floc appeared to be lost by any of the evacuation steps. When the ultraviolet light was shut off at the end of the 135 minute period, the floc stopped forming. Examination of the floc showed it to be powdery and slippery and having essentially about the same appearance as the floc of Run No. 1. Also, infrared analysis of this floc showed absorption at 980 cm.$^{-1}$.

Some of the floc coated substrates of Run No. 2 were heated at 330° C. for 30 minutes, and each produced clear, continuous adherent coatings.

In Runs 3 through 5, the same procedure was followed as in Run No. 2 except as indicated in the table, i.e. different monomer gas pressures were used. In Runs 3 through 5, as in Run 2, the floc polymer became visible about 2 minutes after the ultraviolet light was applied.

In Runs 1 through 5, the white floc polymer appeared to be essentially the same in appearance and was very slippery to the touch. Infrared analysis of a sample of floc of each of the Runs 1 through 5 exhibited absorption at 980 cm.$^{-1}$.

Runs 1 through 5 illustrate that evacuating the reactor periodically does not appear to change the appearance of the floc polymer formed. However, it does appear to affect its molecular structure in that longer reaction mixture residence periods produce polymer with more intense absorption at 980 cm.$^{-1}$.

The percent retention characteristics of Runs 1 through 5 clearly show that increasingly larger amounts of higher molecular weight floc polymer are formed as the tetrafluoroethylene monomer gas pressure is raised in the reaction atmosphere. Fused coatings showing no infrared absorption at 980 cm.$^{-1}$ illustrate complete conversion of the tetrafluoroethylene polymer to a fused polymer having the same spectra as conventional polytetrafluoroethylene.

In Run No. 6, the procedure was the same as that of Run No. 5 except that a Corning filter No. CS7-54(9863) was used which was 3.12 mm. thick. It was determined that the filter passed with 63% transmission light of wave length 2537 A., and about 27% of the light of wave lengths down to about 2400 A., whereas light having a wave length below about 2400 A. was not transmitted to any significant extent. In Run No. 6 no floc polymer was seen or could be detected, indicating that a wave length higher than about 2400 A. is not operable in the present invention.

In Runs 7 through 10, nitrogen gas was present in the reaction atmosphere and was introduced as indicated. The white floc polymer formed in Runs 7 through 10 had the same appearance as the floc polymer of Runs 1 through 5. Infrared analysis of a sample of floc polymer of each of the Runs 7 through 10 showed absorption at 980 cm.$^{-1}$. Runs 7 through 10 illustrate that nitrogen gas can be present in the reaction atmosphere in widely varying amounts without significantly affecting the floc polymer formed.

It was noticed in Runs 1 through 5 and 7 through 10 that although the "floc" polymer deposits at random throughout the reactor, it does not deposit on substrates in the immediate area of thermocouples within the reactor. This indicates that the floc polymer is affected by the magnetic field surrounding the thermocouples, and therefore, capable of being directed by a magnetic field.

EXAMPLE 2

In Runs 11 through 13, the reactor was a 5-gallon metal can, the top part of which was provided with a quartz window that was 3 inches in length. 1½ inches wide and

| Run number | Tetrafluoroethylene (TFE) pressure (torr) | Other gas present and pressure | Total pressure (torr) | Substrate within reactor | Period of time light applied (minutes) | Rate of polymerization (A./min.) | Tetrafluoroethylene polymer formed (description) | Fusion in air Temp. (°C.) | Percent retention | Description of fused polymer |
|---|---|---|---|---|---|---|---|---|---|---|
| 11 | 450 | Reactor flushed with dry N₂, then pre-evacuated to just 250 torr of dry N₂, then 450 torr of TFE gas added. | 700 | Aluminum coupons. Waffle grid. | 190 |  | "Can" reactor produced "floc" substantially the same as that of Example 1. Presence of air did not affect floc properties. |  |  | Clear, highly water-repellent coating formed after fusion at 350° C. |
| 12 | 450 | Reactor flushed with dry N₂, then partially pre-evacuated, then 450 torr of TFE gas added, then additional dry N₂ added to final pressure. | 910 | Aluminum coupons, etc. | 35 | 3,500 | At total pressures above atmospheric substances were not completely cooled by substrate holder, and were not uniformly coated. This rapidly deposited "floc" did not fuse at 350° C. | 350 | 91.5 | High molecular weight form "floc" did not fuse at even 430° C. and did not seal anodized aluminum against corrosion. |
| 13 | 200 | Reactor containing air evacuated to 480 torr of air and then 200 torr of TFE gas added. | 680 | ...do... | 30 |  | Good "floc" coverage over all substrates. Presence of air had no apparent effect on properties of "floc." |  |  | Clear film produced after fusion at 330° C. for 20 min. Showed higher dissipation factors (still in range for Teflon) than those formed in N₂. |
| 14 | 760 | Reactor pre-evacuated and 760 torr of TFE added. No other gas present. | 760 | None | 65 |  | 77 to 88% conversion of the corrosive vapor converted to white "floc." | 350 | 84.8 | Fused film was somewhat opaque. |

¼ inch thick. The bottom portion of the can was provided with inlets and outlets as well as a pressure gauge for servicing the reactor interior with cooling water, vacuum and reaction gases. It was determined that the reactor was not gas tight. The Hanovia lamp was located about 5 cm. above the quartz window. The quartz was transparent to light of wave length greater than 1800 A.

In Run 14 the reactor was a quartz tube which was about 23 cm. long and 3.5 cm. in diameter. The quartz tube was maintained in a horizontal position and the lamp was located about 5 cm. about its central portion. This quartz was transparent to light of wave length greater than 1800 A.

Runs 11 and 13 illustrate that the reactor need not be gas tight and that air can be present in the reaction atmosphere in widely varying amounts without significantly affecting the floc polymer formed. Run No. 12 shows the effect of using a total reaction pressure significantly higher than atmospheric.

Run No. 14 illustrates the use of still another type of reactor. It also shows that the tetrafluoroethylene monomer gas at 760 torr forms a floc polymer having a major amount of high molecular weight polymer as illustrated by its percent retention characteristic upon fusion. The resulting fused film was continuous but slightly opaque indicating that complete fusion was not obtained.

What is claimed is:

1. A white, flocculent snow-like type particulate polymer of tetrafluoroethylene which shows significant infrared absorption at the 980 cm.$^{-1}$ line, which has an index of refraction of about 1.5 and which, at a temperature ranging from about 100° C. to 350° C., fuses into a substantially integral fused form, said white, flocculent snow-like type particulate polymer of tetrafluoroethylene being formed by providing a polymerizable vapor consisting of tetrafluoroethylene monomer vapor at a temperature ranging from about 0° C. to about 200° C. and at a pressure of about 10 torr to 760 torr and subjecting said tetrafluoroethylene vapor to polymerizable means consisting of ultraviolet light of wavelength ranging from 1800 to 2400 A. to polymerize said vapor by a gas-phase reaction to produce, said flocculent polymer of tetrafluoroethylene.

2. A fused polymer of tetrafluoroethylene in substantially integral form which is fused from said white, flocculent snow-like type particulate polymer of tetrafluoroethylene of claim 1.

References Cited
UNITED STATES PATENTS

| | | | |
|---|---|---|---|
| 2,718,452 | 9/1955 | Lontz | 260—92.1 |
| 2,773,781 | 12/1956 | Rodman | 260—92.1 S |
| 2,847,391 | 8/1958 | Wheeler | 260—92.1 |
| 3,513,144 | 5/1970 | Kometani et al. | 260—92.1 |
| 3,228,864 | 1/1966 | Mastrangelo | 204—163 |
| 3,058,899 | 10/1962 | Yanko et al. | 204—159.22 |

HARRY WONG, Jr., Primary Examiner

U.S. Cl. X.R.

117—121, 124, 132, 140, 161; 161—247; 204—159.22; 260—29.6 F, 92.1 S